United States Patent [19]

Kimmel et al.

[11] 3,710,448

[45] Jan. 16, 1973

[54] RECORDING INCLINOMETER

[75] Inventors: J. D. Kimmel; George M. Clark, both of Houston, Tex.

[73] Assignee: Thermotics, Inc., Houston, Tex.

[22] Filed: Aug. 30, 1971

[21] Appl. No.: 176,111

[52] U.S. Cl. ....................33/306, 33/311, 175/45, 346/33 WL

[51] Int. Cl. .......................................E21b 47/02

[58] Field of Search .......346/33 WL, 7; 33/304, 306, 33/307, 308, 310, 311, 313; 73/151; 166/255; 175/45

[56] References Cited

UNITED STATES PATENTS

| | | | |
|---|---|---|---|
| 2,770,887 | 11/1956 | Barnett et al. | 33/310 |
| 2,775,043 | 12/1956 | Suter et al. | 33/311 |

*Primary Examiner*—Joseph W. Hartary
*Attorney*—Ned L. Conley et al.

[57] ABSTRACT

A well bore inclinometer comprises an instrument mounted in a flow tube forming a part of a drill string. The instrument includes a record tape cartridge that is reciprocated each time the pump pressure is shut off and restored. Each upward motion causes the tape to be perforated by a punch on the lower end of a pendulum and to be perforated by a plurality of punches located at the upper end of the cartridge. The position of the hole made by the punch carried by the pendulum relative to the field of holes caused by the plurality of punches indicates degree and direction of inclination. Each reciprocation of the cartridge moves the tape to present a new unpunched area. If the flow tube is made of non-magnetic material, the pendulum may be magnetized to function as a compass, and the punch may then be in the form of a pointer to indicate a compass direction. The cartridge includes a resilient platen disposed beneath the part of the tape being punched. The platen is secured to the cartridge at its periphery leaving the upper surface substantially clear for reception of the punches marking the field as well as that of indicating the direction of inclination. The drive means for moving the tape includes spring means to insure sufficient movement of the tape to present a new unpunched area upon each reciprocation of the cartridge. The instrument portion of the inclinometer may be retrieved from and inserted into the flow tube by means of wire line. To this end a fishing head adapted for making a releasable connection with a wire line fishing tool is attached to the upper end of the instrument. The fishing head is constructed in a manner to provide a low resistance to flow through the flow tube.

14 Claims, 16 Drawing Figures

J D Kimmel
George M. Clark
INVENTORS

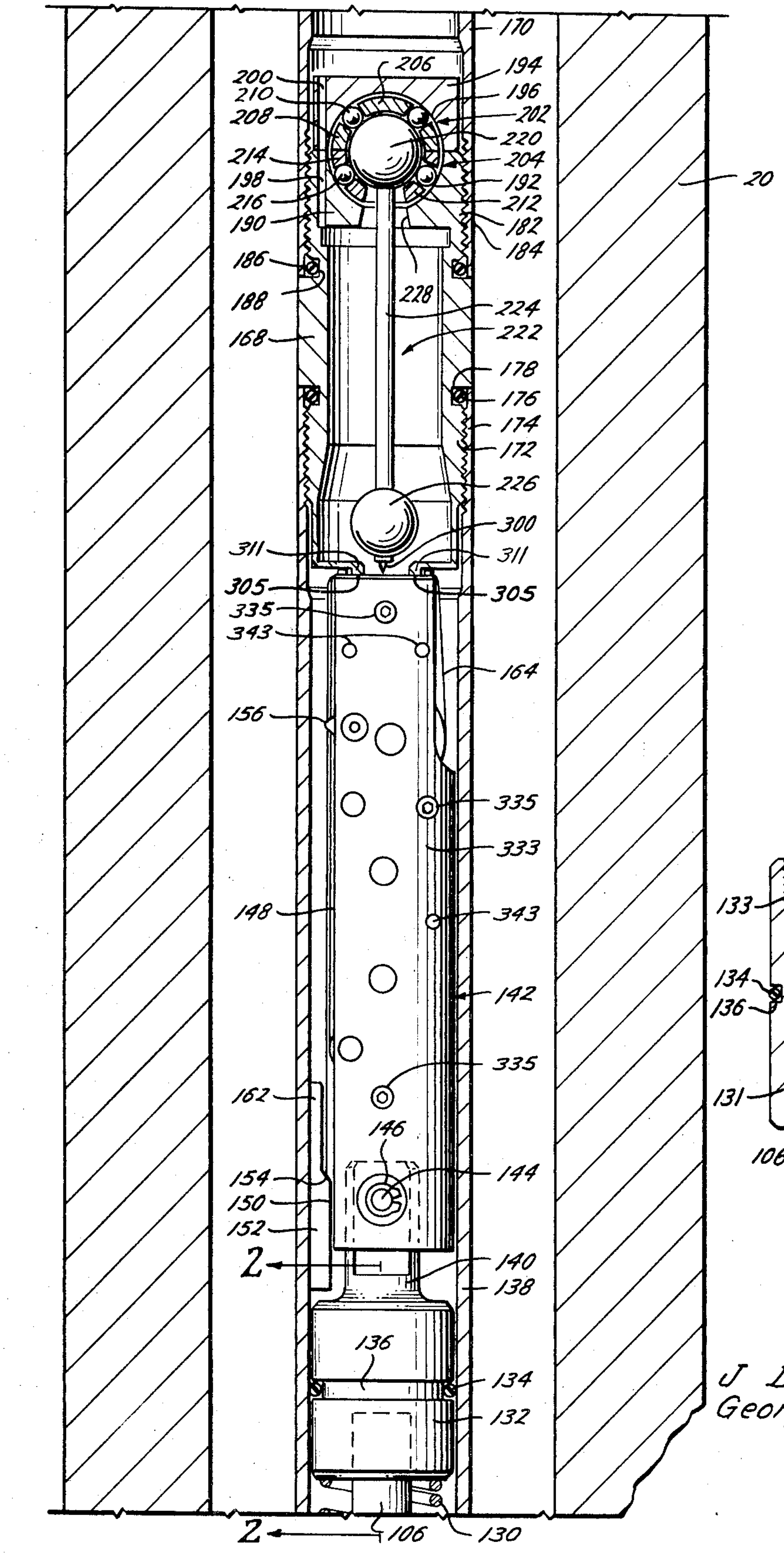
Fig. 1B
Fig. 2
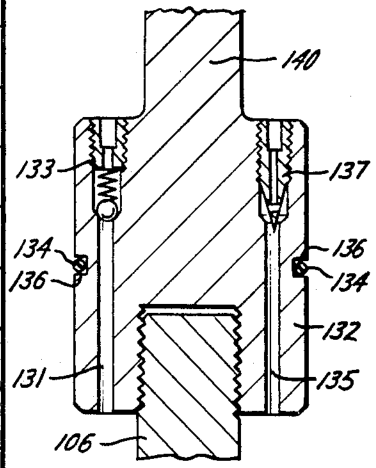
J D Kimmel
George M. Clark
INVENTORS

J D Kimmel
George M. Clark
INVENTORS

J D Kimmel
George M. Clark
INVENTORS

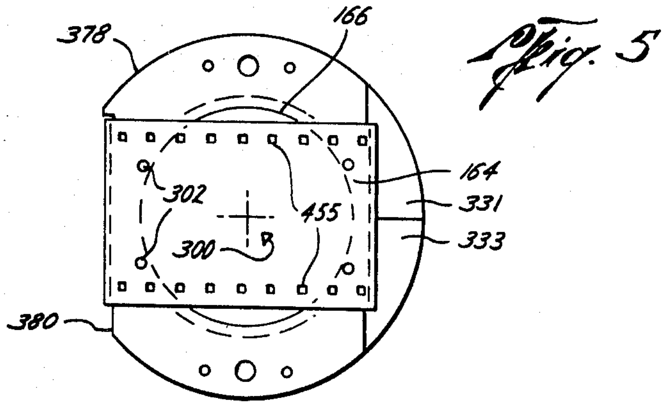
Fig. 5
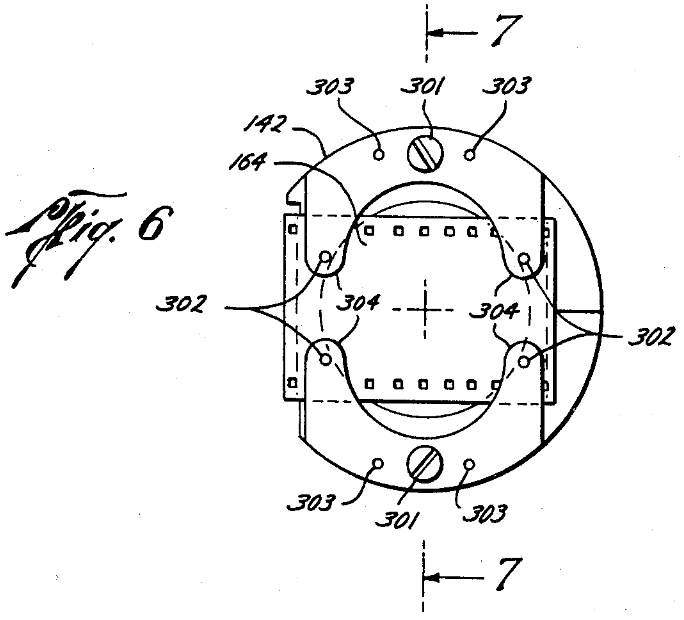
Fig. 6
Fig. 7
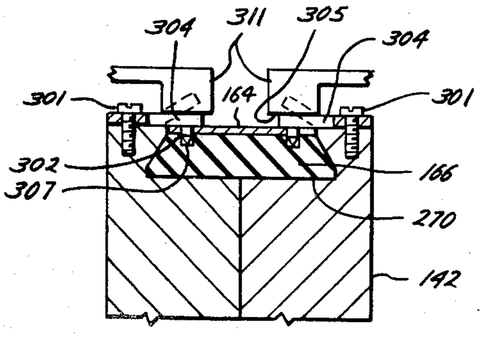
J D Kimmel
George M. Clark
INVENTORS J D Kimmel
George M. Clark
INVENTORS

RECORDING INCLINOMETER

BACKGROUND OF THE INVENTION

1. Field of the Invention

This invention relates to well drilling and more particularly to the determination of the angle and direction of inclination of the well bore, and specifically, to improvements in the recording means of an apparatus useful for that purpose and to means for placing and retrieving the recording instrument of such apparatus.

2. Discussion of the Prior Art

In drilling wells it usually occurs that the well bore deviates from vertical to a greater or lesser extent. In order to determine the extent and direction of deviation a variety of surveying instruments have been devised, many of which include a pendulum to provide a vertical reference in some magnetic device for determining direction. Various means of recording the inclination and direction of the well bore as determined by the surveying instrument have been devised.

The present application discloses improvements upon the invention set forth in U.S. Pat. application Ser. No. 123,961 filed Mar. 15, 1971, by Mason R. Litchfield and Floyd L. Scott, Jr., entitled "Recording Inclinometer," copending herewith, assigned to the same assignee as in the present application. The invention disclosed in the aforementioned Litchfield et al application provides means and methods to determine and record the extent and direction of deviation every time the pumps are shut down, e.g. whenever adding a length of pipe to the drill string or whenever it is desired to make such determination. The well bore inclinometer comprises an instrument mounted in a flow tube forming part of a drill string. The flow tube is provided with upper and lower connection means at its ends for making connection with the other drill string members. The instrument is carried within the flow tube by means of an upper and lower annular seat means disposed within the flow tube and by means of upper and lower spider means disposed at the ends of the instrument such that the seat means of the flow tube support the spider means of the instrument. The upper spider means of the instrument comprises a support tube connected to the instrument by means of azimuthally spaced apart webs. The support tube is received within the upper annular seat means of the flow tube. An upward extension of the support tube is provided with an annular outwardly extending flange forming a fishing head. The instrument includes a record tape cartridge that is reciprocated each time the pump pressure is shut off and restored. Each upward motion of the cartridge causes the tape, resting upon a rubber platen screwed to the upper end of the cartridge, to be punctured by a punch on the lower end of a pendulum. The position of the punched hole relative to the field marked on the tape indicates the degree and direction of inclination of the well bore. Each downward motion of the cartridge causes a pawl disposed within the cartridge to contact a key disposed on the wall of the flow tube such that the pawl is rotated thereby moving the tape one frame so as to present a new field. The pendulum may be magnetized to function as a compass and the punch mark made in the form of a pointer to indicate compass direction relative to the field.

In accordance with the aforesaid Litchfield et al application, the field marked on the tape is stamped or printed thereon prior to placing the tape in the cartridge. It may occur that such marking is inaccurate or that the tape is not correctly positioned in the cartridge relative to the pendulum, in either of which cases, the position of the punch mark relative to the field will give a inaccurate indication of the inclination of the well bore. It is to overcoming this difficulty that the present invention is primarily directed.

A further problem encountered with the construction of the aforementioned copending application lies in the fact that the support tube, forming part of the spider means by which the instrument is mounted in the flow tube and the upward extension thereof forming the fishing head, restricts the flow through the flow tube. This restriction is largely eliminated by the present invention.

Other objects and advantages of the invention will appear from the following description thereof.

SUMMARY OF THE INVENTION

According to the invention, punches have been fastened to the upper end of the cartridge to mark a field on the tape to provide references for the mark resulting from the pendulum. The upper support tube used in the former device is eliminated with the instrument being seated within the flow tube by the peripheral edges of the webs contacting the upper seat means of the flow tube. The fishing head is provided by a pin extending upwardly from the center of the webs. Other features of the new invention include housing the rubber platen in a dovetailed cavity in the upper end of the cartridge rather than bolting it to the cartridge. A sear spring has been added to provide a greater force to hold the pawl in a preferred position and the pawl itself has been lengthened to provide a broader face upon which it can reciprocate against the key.

BRIEF DESCRIPTION OF THE DRAWINGS

For a detailed description of a preferred embodiment of the invention, reference will now be made to the accompanying drawings wherein:

FIGS. 1A, 1B, 1C, together form a vertical section through an inclinometer embodying the invention; the group being sometimes hereinafter referred to as FIG. 1;

FIG. 2 is an axial section through the dashpot piston at the plane indicated in FIG. 1B;

FIGS. 5 and 6 are sections through the upper end of the tape cartridge at the plane indicated in FIG. 3;

FIG. 7 is a section view at the plane indicated in FIG. 6;

DESCRIPTION OF THE PREFERRED EMBODIMENT

DRILL STRING ELEMENT

Figure 1A:
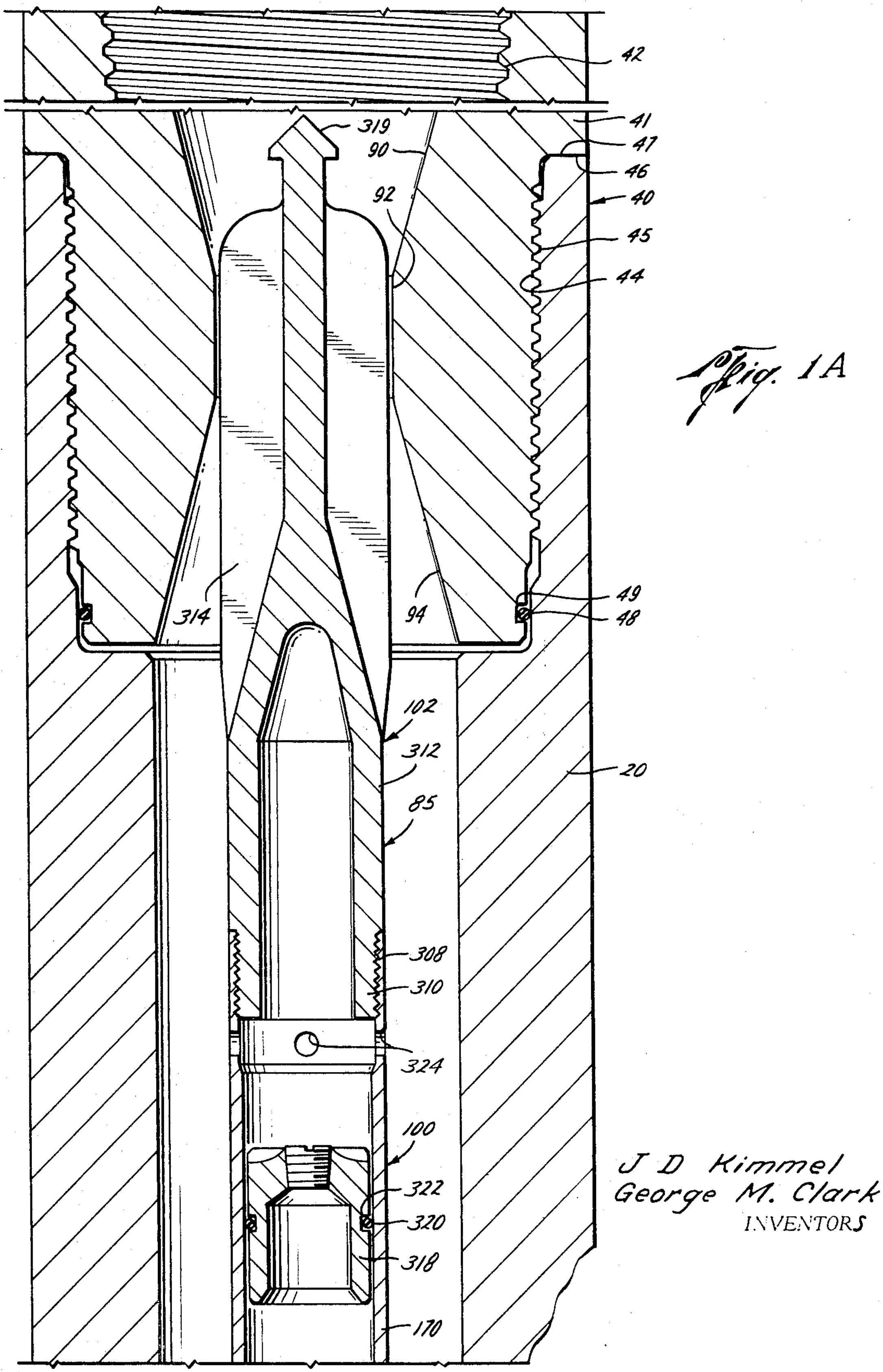
Figure 1C:
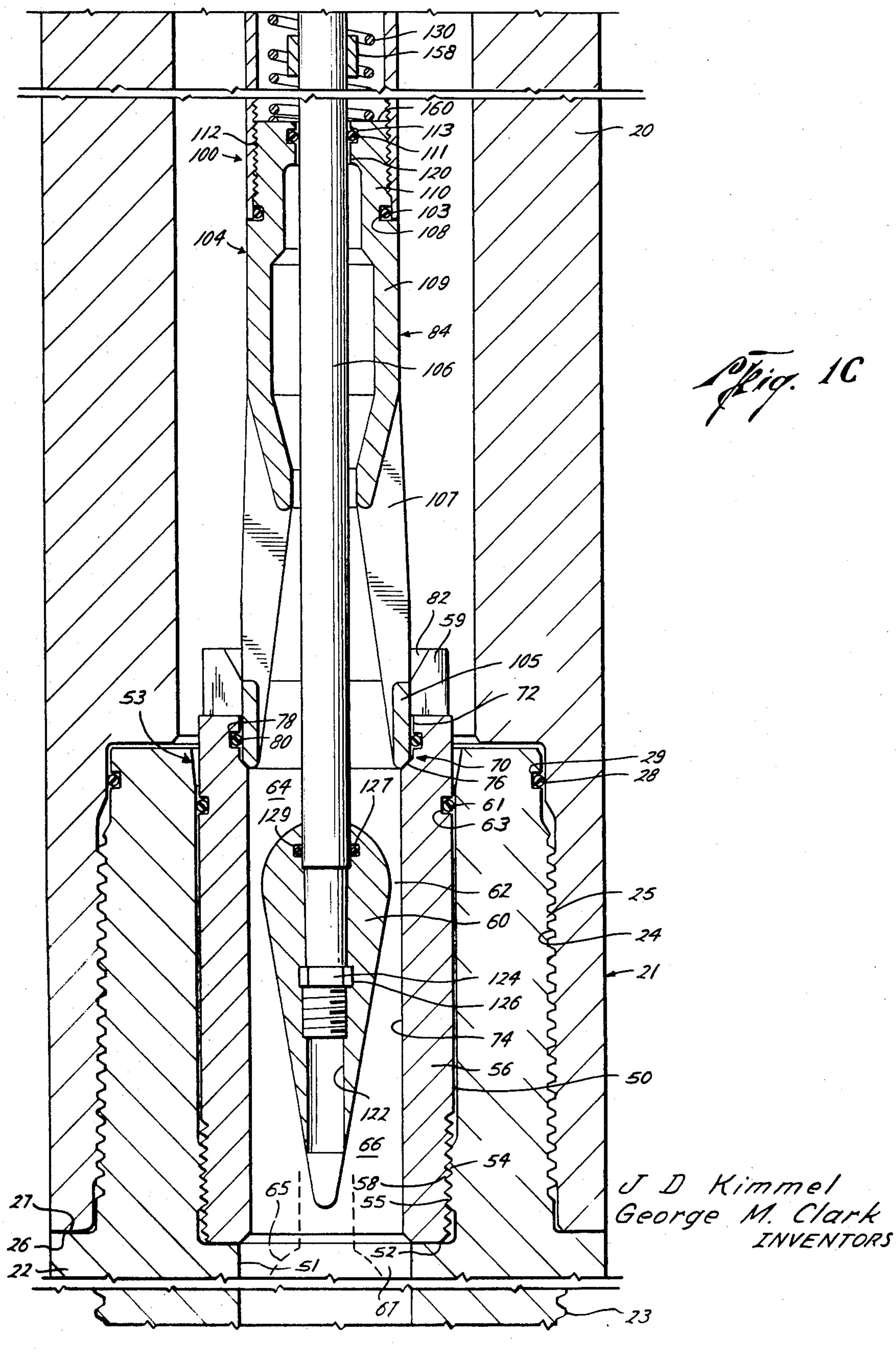
Figures 3, 4, 8, 9:
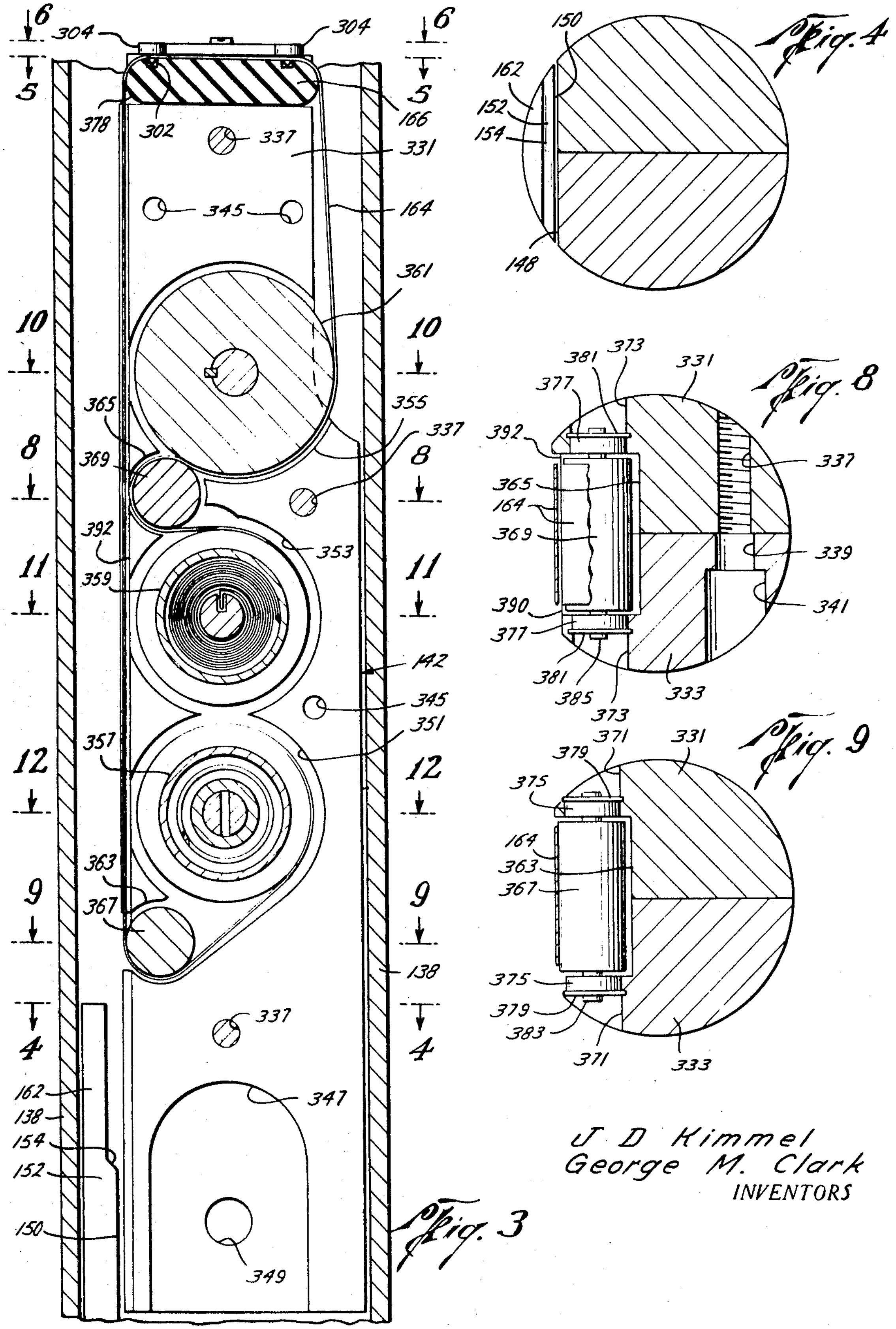
FIG. 3 is an elevation showing the interior of one side of the tape cartridge case.
FIG. 4 is a section through the inclinometer at the plane indicated in FIG. 3.
FIGS. 8–12 are sections through the tape cartridge at the planes indicated in FIG. 3.

Referring now to FIG. 1 there is shown a well bore inclinometer including a short length of pipe 20 having inner and outer diameters of drill collar dimensions. The lower end of pipe 20 is connected at 21 to tubular sub 22 having a tapered threaded pin 23. Pin 23 provides threaded means for making a rotary shouldered connection with the box of another portion of a drill string, e.g. a drill bit (not shown) to be connected below the inclinometer.

Connection 21 includes threaded box 24, threaded pin 25, engaged shoulders 26, 27, and an O-ring seal 28 disposed in annular groove 29 at the end of pin 25.

The upper end of pipe 20 is connected at 40 to tubular sub 41 provided with a tapered threaded box 42. Box 42 provides means for making a rotary shouldered connection with a pin on the lower end of another portion of a drill string, e.g. a drill collar (not shown) to be connected above the inclinometer.

Connection 40 includes threaded box 44, threaded pin 45, engaged shoulders 46, 47, and an O-ring seal 48 disposed in annular groove 49 at the end of pin 45.

The pipe 20, sub 22, and sub 41, together constitute a flow tube adapted to form an element of a rotary drill string and provide means to transmit fluid and forces (axial, torsional, bending and all other mechanical forces) between adjacent portions of a drill string connected thereabove and therebelow.

FLUID PRESSURE RESPONSIVE ACTUATING MEANS

Referring once more to the lower end of the inclinometer, the sub 22 is provided at its upper end with a choke socket 53 including a cylindrical bore 50 of large diameter than flow passage 51 therebelow forming an upwardly facing shoulder 52. The lower end of bore 50 is provided with an inwardly projecting thread 54. Received within the choke socket is a replaceable choke sleeve 56 of hard wear resistant material. Sleeve 56 is threaded at 58 to engage socket thread 55 to retain the sleeve in the socket. The sleeve is castellated at its upper end as shown at 59 to facilitate insertion and removal. An O-ring seal 61 is disposed in annular groove 63 around sleeve 56 to seal between the choke socket and sleeve.

The inner diameter of sleeve 56 is smaller than the diameter of flow passage 51. Mounted for axial reciprocation in sleeve 56 is a flow restriction plug 60. When plug 60 is positioned in sleeve 56 as shown, fluid flow between the plug and sleeve is restricted to flow through the annulus 62 therebetween. A downward flow through the sleeve causes a pressure differential between the space 64 above the plug and that at 66 below the plug. This pressure differential exerts a force tending to move the plug down into flow passage 51 at 65 where there is more space 67 for fluid flow, as shown in dashed lines in FIG. 1C.

INSTRUMENT MOUNTING

Sleeve 56 is provided at its upper end with seat means 70 comprising a bore 72 of larger diameter than the inner diameter of sleeve 56 at 74, with an upwardly facing conical shoulder 76 therebetween. An annular groove 78 in bore 72 receives an O-ring seal 80. The upper inner edge of sleeve 56 is bevelled at 82 to provide guide means for facilitating entry of the lower end 84 of the inclinometer instrument 85.

Referring now to the upper end of the inclinometer, the flow passage through sub 41 includes an upper conically tapered downwardly converging guide portion 90, a central cylindrical seat means portion 92, and a lower downwardly flaring conically tapered portion 94. Seat means 92 is adapted to receive and laterally support the upper end of inclinometer instrument 85.

It will be seen from the foregoing that the inclinometer instrument 85 is supported at its ends in seat means 70 and 92 carried by the fluid conducting portion of the inclinometer, the fluid conducting portion or flow tube, as previously stated, comprising pipe 20 and subs 22, 41. Seal means 80, at the lower seat means 70, seals with the lower end of the instrument.

The instrument 85 includes a tubular housing 100 into the upper and lower ends of which are screwed tubular spiders 102, 104.

The spiders 102, 104 are received by seats 92 and 70 providing means releasably mounting the instrument in the flow tube.

LOWER SPIDER

Spider 104 includes a tube 105 received in seat 70, a plurality of radial webs 107 azimuthally spaced apart leaving fluid passages therebetween, and a tubular hub 109. Spider 104 is sealed to the housing by O-ring 103 carried in annular groove 108 on pin 110 at the upper end of the hub 109, the pin engaging the threads 112 inside the lower end of the housing. The central bore 120 in the upper end of the hub 109 provides bearing means within which actuator stem 106 is reciprocatingly disposed. An O-ring seal 111 disposed in annular groove 113 in bore 120 provides a seal between stem 106 and bore 120.

The lower end of stem 106 extends into bore 122 in plug 106 and is screwed into split nut 124 disposed in groove 126 in plug 60. O-ring seal 127 disposed in groove 129 in plug 60 seals the plug 60 to stem 106. The plug is torpedo shaped to minimize turbulence and attendant wear on the plug and choke sleeve 56 due to the passage of the usually abrasive drilling fluid.

SPRING BIAS

Stem 106 extends through spider bore 120 into the lower part of instrument housing 100. Also disposed in the lower part of housing 100 is a helical compression spring 130 bearing at its lower end against the upper end of spider hub 109. The spring coaxially encompasses the stem 106.

DASHPOT

At its upper end the stem 106 is screwed into a generally cylindrical dashpot piston 132 (see FIG. 2). The upper end of spring 130 bears against the lower end of piston 132. Piston 130 reciprocates in tube 138 which forms the lower part of housing 100. Tube 138 is filled with light oil to restrain movement of piston 132 axially within the tube. The fit between the outer periphery of the piston and the inner periphery of the tube may provide sufficient clearance to allow fluid passage therepast.

Preferably, however, an O-ring 134 is disposed in annular groove 136 around the piston 132, providing means to seal between the piston and tube 138, and there are ports 131, 135 extending through the piston 132 from the lower end to the upper end thereof providing passages for the flow of fluid past the piston. A check valve 133 disposed in the upper end of port 131 and a control valve 137 disposed in the upper end of port 135 provide an adjustable predetermined directionally asymetrical restriction of the flow past the dashpot piston 132.

The control valve 137 restricts the flow equally form both the upper end of the piston 132 and from the lower end of the piston 132 in accordance with its position of adjustment. The check valve 133 prevents flow through port 131 that enters from the upper end of the piston 132 but permits fairly free flow through port 131 that enters from the lower end. The flow passage means, comprising ports 131, 135, and valves 133, 137, permits the dashpot piston 132 to make faster descent than ascent within the instrument 85. The dashpot presents a relatively low resistance to downward motion, such as occurs when the pumps are turned on and drilling fluid flows down through the drill pipe, but provides a greater resistance to upward motion so that the instrument will not be moved to the recording position by short duration pressure drops, but only by such extended pressure drops as occur when a length of pipe is added to the drill string or it is specifically desired to record the well inclination and the pumps are shut down. The valves 133, 137 also provide a means for predetermining the rate of movement of the dashpot piston 132 within the tube 138 and thus provide a means for adjustable delay action.

Piston 132 is provided with a tongue 140 extending upwardly therefrom into a tape cartridge 142. Tongue 140 is pivotally connected to the generally cylindrical tape cartridge 142 by a pin 144 passing through apertures in the cartridge and tongue and retained in position by split ring 146.

Cartridge 142 is adapted to reciprocate within housing tube 138 whenever the fluid flow through the fluid conducting portion of the inclinometer is shut off and resumed. A flat portion 148 (FIG. 2) on the cartridge cooperates with a flat inner surface 150 on a key 152 fastened to tube 138 to prevent the cartridge from rotating within housing tube 138.

Key 152 also includes a cam shoulder 154. Whenever there is fluid flow through the flow tube of the inclinometer sufficient to force plug 60 and actuator stem 106 downwardly against the resistance of spring 130 and the flow is maintained long enough to overcome the resistance of dashpot piston 132, cartridge 142 is moved downwardly to the extent that escapement pawl 156 is engaged and moved by cam shoulder 154. At this point further travel is prevented by stop collar 158, fastened to actuator stem 106, engaging the stop means provided by the upper end 160 of spider hub 109.

When fluid flow through the flow tube is cut down sufficiently, e.g. cut off, the plug 60 and actuator stem move upwardly under the force of spring 130. If the flow reduction is maintained long enough to overcome the resistance of dashpot piston 132, cartridge 142 is moved upwardly to the extent that escapement pawl 156 moves past shoulder 154 to the upper thinner part 162 of the key 152 which allows the pawl to turn back to its previous position under the action of the escapement and connected mechanisms that will be described hereinafter.

Upon resumption of flow, of sufficient magnitude and time duration, the cartridge 142 again moves down an escapement pawl 156 again rides up over cam shoulder 154. Thus, each time the pumps are shut off and turned on again, as when a joint of pipe is added to the drill string, the escapement pawl is actuated one cycle. This causes recording tape 164 to move one frame over platen 166 provided at the upper end of the cartridge.

PENDULUM

Lower tube 138 of instrument housing 100 is connected by double pin tubular connector 168 to an upper tube 170 forming an upper part of housing 100. Connector 168 is provided with a threaded lower pin 172 engaging threaded socket 174 in the upper end of tube 138 and sealed thereto by O-ring seal means 176 disposed in annular groove 178 at the base of the pin 172. Connector 168 is further provided with a threaded upper pin 182 engaging threaded socket 184 in the lower end of tube 170 and sealed thereto by O-ring seal means 186 disposed in annular groove 188 at the base of pin 182.

Pin 182 is provided at its upper end with a bearing block 190 integral therewith. Block 190 has an upwardly facing hemi-spherical surface 192. A bearing cap 194 is fastened to block 190 by a plurality of screws, not shown. Cap 194 has a downwardly facing hemi-spherical surface 196. Aligned ports 198, 200 provide passage means for flow of fluid, e.g. oil, between connector 168 and upper tube 170.

Upper ball bearing means 202 is disposed in cap 194. Lower ball bearing means 204 is disposed in block 190. The upper ball bearing means includes inner and outer races 206, 208 between which are disposed spheres 210. The lower ball bearing means includes inner and outer races 212, 214 between which are disposed spheres 216.

Disposed between spheres 210 and 216 is a ball 220. Ball 220 supports a pendulum 222 including a stem 224 connected to ball 220 and a bob 226 connected to stem 224. Stem 224 extends through aperture 228 in the bearing block 190. Block 190, cap 194, ball bearing means 202, 204, and ball 220 form an antifriction universal joint of the ball and socket type. The universal joint supports the pendulum for turning in any direction except as limited by the sides of the bob 226 contacting the inner periphery of pin 172.

MARKING MEANS

Bob 226 has a marking means 300 adapted to make a mark on tape 164. Preferably marking means 300 is a punch, and platen 166 is made of soft resilient means such as rubber so that the punch can pass through tape 164.

It may be desirable for pendulum 222 or ball 220 or both to be permanently magnetized as a dipole, or carry permanent dipole magnets, with the axis of magnetization lying in a plane perpendicular to the pendulum axis, so that the dipole axis lines up with the earth's magnetic field, the surrounding parts of the inclinometer being made of non-magnetic material such as monel. The marking means is in the form of an arrow or V so that when the recording tape is punched, the resulting mark indicates not only angle of inclination but also direction of inclination.

In order to provide reference means on the tape whereby the extent or magnitude of the inclination can be readily determined, an improvement of the Litchfield et al application has been made in the present apparatus. There are four marking means, e.g. punches 302, in the present invention, carried by arms 304 fastened to the upper end of the cartridge 142 by means of screws 301 and guides 303 (see FIG. 6). Everytime cartridge 142 carries platen 166 and tape 164 up against marking means 300, the tape is also marked by the marking means 302, as the stops 311 disposed on the lower end of the connector 168 at 305 presses down on the resilient arms 304 with attached markers 302, the latter defining a square frame or field with sides parallel and perpendicular to the sides of the tape by punching holes in the tape. Recesses, such as holes 307 in the platen 166, provide a means for allowing punches 302 to pass through the tape and into the platen 166 without resistance (see FIG. 7). The stops 311 on the end of the connector 168 at 305 also provides means for limiting the upward travel of the cartridge. The escapement mechanism, hereinafter described, controlled by pawl 156, causes the tape 164 to advance one frame on each up and down cycle of the cartridge and corresponding cycle of the escapement. At each cycle, a new frame is marked and the inclination of the well bore as indicated by the pendulum is recorded as to both magnitude and direction.

UPPER SPIDER

The upper end of the tube 170 is provided with a threaded socket 308 receiving and engaging threaded pin 310 provided on the lower end of hub 312 forming part of spider 102. From hub 312 extend azimuthally spaced webs 314 providing fluid flow passages therebetween. In the Litchfield et al. application, webs 314 connected at their upper ends to a support tube received within the upper seat 92 and having an upward extension providing a tubular fishing head. The support restricts the flow through the flow tube. In the present apparatus the support tube has been eliminated and a pin extending upwardly from the center of the webs 314 provide a fishing head 319.

The fishing head 319 provides a means for insertion and retrival whereby the instrument may be inserted into or retrieved from the flow tube without pulling the drill pipe. An overshot wire line fishing tool (not shown) may be releasably secured to the fishing head 319. Suitable fishing tools for such purpose are generally described on pages 3867–3872 of the "Composite Catalog of Oil Field Equipment and Services," 29th Revision (1970–71) published by World Oil, a Gulf Publishing Company Publication, Houston, Texas. By means of a wire line attached to the fishing tool, the instrument may be raised or lowered within the drill pipe whereby the instrument may be retrieved from or inserted into the flow tube. Jars included in the wire line would be of assistance in pushing the instrument into the seats in the flow tube and in releasing the fishing tool from the instrument.

PRESSURE BALANCING MEANS

A piston 318 is slidably disposed within tube 170 and sealed thereto by O-ring seal means 320 disposed in annular groove 322 on the piston. A plurality of ports 324 through tube 170 admit drill string fluid into tube 170. The resulting fluid pressure acts downwardly on piston 318 and the pressure of the fluid in tube 170, e.g. oil, below piston 318 acts upwardly thereon, the piston moving up or down until these forces are in balance. This prevents the instrument housing from collapsing or exploding under variations in pressure in the drill string. In this regard it may be noted that at the bottom of the drill string near the bit, there may be a hydrostatic head of several thousand feet of drilling mud, to which may be added the pump pressure whenever the mud pumps are actuated, less whatever pressure drop exists in the fluid path between the pumps and the instrument. Therefore, there may be a considerable variation in drill string pressure at the instrument level.

TAPE CARTRIDGE

Referring now to FIGS. 3 through 12, there is shown the detail of the tape cartridge 142. The cartridge includes two modified hemi-cylindrical bodies 331, 333 releasably fastened together by screws 335 (see FIGS. 1 and 3) extending into threaded holes 337 in body 331 through holes 339 in body 333, the heads of the screws being received in counterbores 341. Additional holes 343 in body 333 are adapted to receive guide pins 345 to insure accurate alignment of bodies 331, 333 when assembled.

The bodies 331, 333, are provided with correlative recesses 347 adapted to receive tongue 140 (see FIG. 1) and allow angular displacement of cartridge 142 relative to dashpot piston 142. Coaxial holes 349 in the bodies 331, 333 forms a bearing to receive pin 144 that pivotally connects tongue 140 to cartridge 142.

Figures 10, 11, 12, 13, 14:
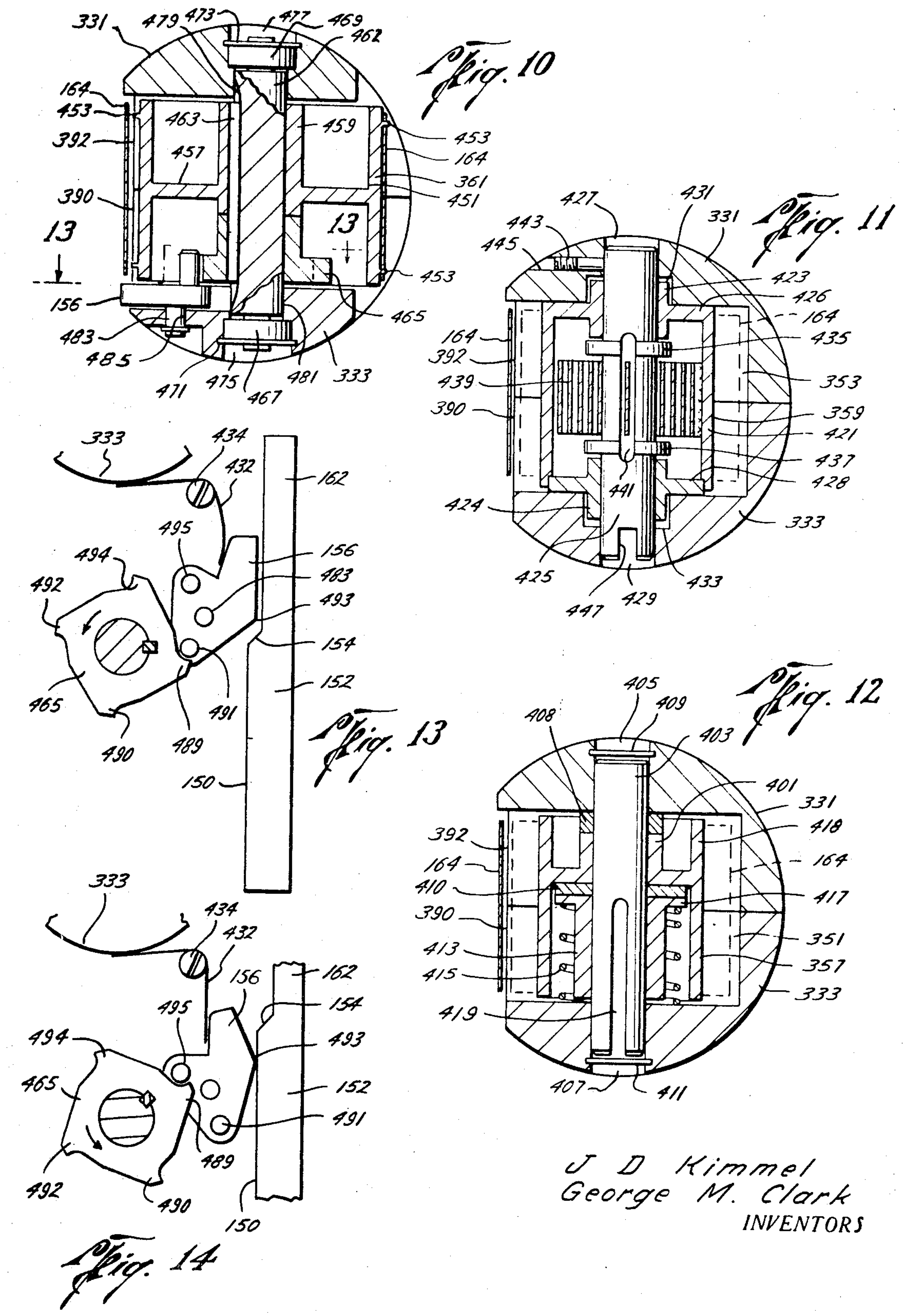
FIG. 13 is a rear view of a fragmentary section at plane 13—13 of FIG. 10.
FIG. 14 is a view similar to FIG. 13 but showing the parts in a different position.

A plurality of pairs of correlative recesses 351, 353, 355 are adapted to receive respectively a tape supply reel 357 with friction brake, as detailed in FIG. 12, a tape takeup reel 359 with spring drive, as detailed in FIG. 11, and a measuring reel 361 with escapement, as detailed in FIGS. 10, 13 and 14.

Pairs of correlative recesses 363, 365 are adapted to receive idler guide rollers 367, 369. Pairs of coaxial holes 371, 373 provide support for pairs of ball bearings 375, 377, held in place in the holes by pairs of snap rings 379, 381. Shafts 383, 385, on which rollers 367, 369 are mounted, are rotatably carried by the bearings 375, 377.

An improved structure for retaining the platen 166 has been provided in the present invention. At the upper ends of cartridge bodies 331, 333 are correlative recesses 378, 380 forming a cavity in which rubber platen 166 is housed and retained. In the Litchfield et al application, the platen has been secured in position by means of cap screws and washers. In the present apparatus the platen 166 has been retained in position by means of dovetailing as shown in FIGS. 5 and 7. Bodies 331 and 333 have corresponding dovetail cavities at 270 in the upper end of the cartridge 142 whereby platen 166 has a mating dovetailed peripheral edge disposed within and retained by said cavities. The platen mounting structure just described is believed to be an improvement over that disclosed in the aforementioned Litchfield et al application in that the elimination of the cap screws and washers permit the four markers 302 to penetrate into the recesses 307 in the platen 166.

As shown in FIG. 2, tape 164 unreels from supply reel 357, passes over guide roller 367 and travels up along the coplanar flats 390, 392 at the side of the cartridge bodies, then turns and passes over rubber platen 166 and turns back, goes over measuring reel 361, doubles back over roller 369, and winds up on take-up reel 359.

SUPPLY REEL AND BRAKE

Referring now to FIG. 12, the supply reel 357 includes a sleeve 401 which is fixedly mounted on a shaft 403. Shaft 403 extends into aligned holes 405, 407 in cartridge bodies 331, 333, and is held against axial motion by snap rings 409, 411. A thrust washer 408 is disposed between the end sleeve 401 and the adjacent wall of recess 351 in the body 333. A thrust washer 410 is disposed between the other end of sleeve 401 and thrust collar 413. A helical compression spring 415 bears at one end adjacent flange 417 on the thrust collar 413 and at its other end against the adjacent side of recess 351 in cartridge body 333. The spring produces sufficient axial loading on the thrust collar, thrust washers, and sleeve 401 to create a frictional drag or braking action resisting rotation of reel 357.

Sleeve 401 of reel 357 is preferably press fitted onto shaft 403. Shaft 403 is slotted at 419 whereby a key blade can be inserted to turn shaft 403 and with it reel 357. By this means a tape 164 can be rewound on reel 357 whenever desired.

Means, not shown, such as a spring clip, is preferably provided for enabling one end of the tape to be secured to drum 418 forming the outer periphery of reel 357. Alternatively, the tape, e.g. a brass strip of a few thousandths of an inch thickness, may be fastened to drum 418 with pressure sensitive adhesive tape.

TAKE-UP REEL AND SPRING

Referring now to FIG. 11, the take-up reel 359 includes a drum 421 carried by bearing sleeves 423, 424. Sleeve 423 has a flange 426 integral with drum 421 and sleeve 424 has a flange 428 telescopically fitting into the end of drum 421. Sleeves 423 and 424 are rotatably mounted on shaft 425. The ends of shaft 425 are disposed in coaxial holes 427, 429 in the cartridge bodies 321, 333. Counterbores 431, 433 receive the outer ends of sleeves 423, 424 positioning the drum centrally in recess 353. Shaft 425 is provided with thrust collars 435, 437 which lie adjacent the inner ends of sleeves 423, 424. The shaft 425 is thereby retained against axial displacement out of holes 427, 429.

A coilde flat spring 439 is wound around shaft 425 and has one end tucked into slot 441 in the shaft or is otherwise fastened thereto. The other end of spring 439 is secured to drum 421, e.g. by soldering thereto. Normally a set screw 443 screwed into threaded hole 445 bears against shaft 425 to prevent rotation thereof. However, when it is desired to wind up the spring the set screw is loosened and the blade of a key or screwdriver is inserted into slot 447 and shaft 425 is turned. As the shaft turns the spring is wound up, it being understood, of course, that drum 421 is held against rotation during this time, e.g. by tape 164, one end of which is secured thereto, e.g. in the same manner as the other end is secured to the drum 419 of reel 357. The tape will be held against movement during such time by the measuring reel and escapement next to be described.

MEASURING REEL AND ESCAPEMENT

Referring to FIGS. 10, 13 and 14, and particularly to FIG. 10, the measuring reel 361 includes an outer cylindrical drum 451 which has sprocket teeth 453 at its ends uniformly spaced apart about the periphery thereof which engage correlative holes 455 (see FIG. 3) in the tape 164. A central radial flange 457 connects the drum 451 to sleeve 459. The sleeve is fastened to shaft 462 by a key 463 engaging correlative slots in the sleeve and shaft. The same key also secures escapement wheel 465 to shaft 462 in like manner. Shaft 462 is rotatably mounted in ball bearings 467, 469 disposed at the ends of the shaft, the ball bearings being held by snap rings 471, 473 in counterbores 475, 477 to holes 479, 481 in cartridge bodies 331, 333.

The present application has improved certain features of the pawl 156 over that of the Litchfield et al application. The pawl 156 is pivotally mounted by its pivot pin 483 in bearing hole 435 in cartridge body 333. A pressure, forcing a pawl 156 to rotate against the key 152, enables the tape 164 to move when the cartridge reciprocates. The Litchfield et device relies merely on the force placed on the pin 491 of the pawl 156 by the escapement wheel 465. This force is brought about by the spring 439 of the takeup reel acting on tape 164 which in turn, acting through sprocket drum 451, tends to turn shaft 462 and escapement wheel 465 in the direction of the arrow (FIG. 13), the teeth 489, 490, 492, 494 of the escapement wheel acting on pin 491, of the pawl 156. This may not always provide sufficient bias to move the pawl 156 against the key 152 so as to engage the cam surface 154 of the key 152 upon the reciprocation of the cartridge to rotate the pawl 156 thereby moving the tape 164 one step. The present apparatus includes a sear spring 432. The sear spring 432 is anchored by screw 434 threaded into body 333 and has one end pressing against a corresponding groove in body 333 and the other end pressing against pawl 156. This pressure requires pawl 156 to rotate against key 152 thereby always engaging cam surface 164 upon the reciprocation of the cartridge. Also the side of pawl 156 which reciprocates against key 152 has been lengthened to improve contact between the pawl 156 and the key 152.

Whenever cartridge 142 moves down relative to key 152 to the position shown in FIG. 14, in the manner previously described, the cam surface 154 engages the tail 493 of pawl 156 and turns the pawl to the position shown in FIG. 14. This moves pin 491 out of engagement with escapement wheel tooth 489 and the escapement wheel turns approximately one-eighth of a revolution until wheel tooth 489 engages pawl pin 495. At this time the pawl is prevented from turning by engagement of pawl tail 493 with surface 150 of key 152.

Whenever cartridge 142 moves back up away from key 152 to the position shown in FIG. 13, in the manner previously described, pawl 156 turns back to the position shown in FIG. 13. This causes pawl pin 495 to move out of engagement with wheel tooth 489 and allows the wheel 465 to turn in the direction of the arrow until wheel tooth 490 engages pawl pin 491. The wheel has now turned one-quarter revolution and allowed to take-up drive to move the tape a corresponding distance. This action is repeated every time cartridge 142 moves down and up relative to key 152.

OPERATION AND USE

As the tape is moved step by step under the control of the measuring reel and escapement, as actuated by reciprocation of the cartridge 142, caused by changes in fluid pressure, or to be more precise, by changes in rate of fluid flow past plug 60, the marking means causes the position of the pendulum relative to the flow tube to be marked on the tape. Whenever desired, the cartridge can be moved from the flow tube and the tape read to determine the inclination of the well bore bottom at various times. A record of hole depth and time of day will be kept versus actuations of the inclinometer so that the record of the tape can be plotted against drilling progress.

Normally the cartridge will be removed and the tape replaced every time the drill string is removed from the well bore, as when changing bits, but it can also be removed (and the tape replaced) at any time by means of the overshot wire line fishing tool, the fishing tool releasably engaging with the spear head 319 provided by upper spider tube 316.

MATERIALS

As indicated by the drawings, the instrument is preferably made of metal, e.g. steel. If the tool is to include a magnetic pendulum to indicate direction, then the other parts should all be made of non-magnetic material such as Monel, stainless steel, or brass.

Although the tape 164 has been described as being made of brass, other materials that have a low temperature coefficient of expansion and a resistance to delineation under ambient conditions in a well bore could be used.

While a preferred embodiment of the invention has been shown and described, modifications thereof can be made by one skilled in the art without departing from the spirit of the invention.

I claim:

1. A well tool comprising:

a flow tube for connection in a drill string to transmit drilling fluid, an instrument mounted in said flow tube, said instrument including indicator means responsive to a well characteristic for producing an indication measuring said characteristic, recording means to record the indication of said indicator means, flow responsive means responsive to the rate of flow through said flow tube to actuate said recording means, said recording means including marking means carried by said indicator means and mark receiving means actuated by said flow responsive means to actuate said recording means, and a plurality of markers in position to engage said mark receiving means and define a field thereon.

2. A well tool according to claim 1 wherein said instrument includes a support, said indicator means being carried by said support, said mark receiving means being movable relative to said support to actuate said recording means, said markers being affixed to said mark receiving means, and a marker actuating means fixed relative to said support.

3. A well tool according to claim 1 wherein said mark receiving means includes a tape to record the indication of said indicator means, and said markers comprise a plurality of punches adapted to perforate said tape to define a field thereon.

4. A well tool according to claim 3 wherein said plurality of punches are fixed to individual arms, said arms being attached to said mark receiving means whereby upon the upward movement of said mark receiving means against said marking means said punches engage said tape and define a field thereon.

5. A well tool according to claim 3, wherein said mark receiving means includes a cartridge, said plurality of punches being affixed to individual resilient arms, said arms being anchored to the upper end of said cartridge, said arms having a first position in which the punches do not engage the tape and a second position in which the punches perforate the tape, said arms normally occupying said first position, whereby said arms move from said first position to said second position when said mark receiving means engages said indicator means, said punches defining said field on said tape when said arms are in said second position.

6. A well tool according to claim 3 wherein said mark receiving means includes a cartridge, said cartridge including recesses disposed in the upper end of said cartridge, said recesses cooperating with said punches such that said punches perforate said tape by passing through said tape and into said recesses.

7. A well tool according to claim 6 wherein said cartridge includes a resilient elastomeric platen, said platen being disposed in the upper end of said cartridge, and said recesses being disposed in said platen.

8. A well tool according to claim 7, wherein said platen is dovetailed into the upper end of said cartridge.

9. A well tool according to claim 1, wherein said well tool includes a means for insertion of said instrument into and retrieval from said flow tube, said means includes a fishing head disposed on the upper end of said instrument adapted for engagement with an overshot wire line fishing tool, said fishing head being connected to said upper end of said instrument by means of a rod, and said rod having radially extending webs azimuthally spaced apart on the longitudinal surface of said rod to seat the upper end of said instrument within said flow tube.

10. A well tool according to claim 1, wherein said instrument includes a support, said mark receiving means includes a cartridge, said cartridge being movable relative to said support, said support having a key with a cam and said cartridge having a marking tape and a means controlled by a pawl to move said marking tape relative to said cartridge, said pawl engaging said cam upon the downward movement of said cartridge thereby rotating the pawl and causing the tape to move, and said pawl being biased against said key by a spring such that the upward movement of said cartridge causes the withdrawal of said cam thereby rotating the pawl and causing the tape to move further.

11. A well tool according to claim 10 wherein said spring biasing the pawl against the key is a sear spring, said sear spring being under compression between the pawl and the body of said cartridge, and said pawl having an extended side for contact with said key.

12. A well tool comprising:

a flow tube for connection in a drill string to transmit drilling fluid, an instrument mounted in said flow tube, said instrument including indicator means responsive to a well characteristic for producing an indication measuring said characteristic, recording means to record the indication of said indicator means, a flow responsive means responsive to the rate of flow through said flow tube to actuate said recording means, said recording means including marking means carried by said indicator means and mark receiving means actuated by said flow responsive means to actuate said recording means, and said well tool including a means for insertion of said instrument into and retrieval from said flow tube, said means including a fishing head disposed on the upper end of said instrument adapted for engagement with an overshot wire line fishing tool, said fishing head being connected to said upper end of said instrument by means of a rod, and said rod having radially extending webs azimuthally spaced apart on the longitudinal surface of said rod to seat the upper end of said instrument within said flow tube.

13. A well tool comprising:

a flow tube for connection in a drill string to transmit drilling fluid, an instrument mounted in said flow tube, said instrument including indicator means responsive to a well characteristic for producing an indication measuring said characteristic, recording means to record the indication of said indicator means, a flow responsive means responsive to the rate of flow through said flow tube to actuate said recording means, said recording means including marking means carried by said indicator means and mark receiving means actuated by said flow responsive means to actuate said recording means, and said instrument includes a support, said mark receiving means includes a cartridge, said cartridge being removable relative to said support, said support having a key with a cam and said cartridge having a marking tape and a means controlled by a pawl to move said marking tape relative to said cartridge, said pawl engaging said cam upon the downward movement of said cartridge thereby rotating the pawl and causing the tape to move, and said pawl being biased against said key by a spring such that the upward movement of said cartridge causes the withdrawal of said cam thereby rotating the pawl and causing the tape to move further.

14. A well tool according to claim 13, wherein said spring biasing the pawl against the key is a sear spring, said sear spring being under compression between the pawl and the body of said cartridge, and said pawl having an extended side for contact with said key.

* * * * *